(12) United States Patent
Tobari et al.

(10) Patent No.: US 12,341,447 B2
(45) Date of Patent: Jun. 24, 2025

(54) POWER CONVERSION DEVICE

(71) Applicant: Hitachi Industrial Equipment Systems Co., Ltd., Tokyo (JP)

(72) Inventors: Kazuaki Tobari, Tokyo (JP); Yusaku Onuma, Tokyo (JP); Takuya Sugimoto, Tokyo (JP); Hiroshi Watanabe, Tokyo (JP); Mutsuo Tokashiki, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 130 days.

(21) Appl. No.: 18/021,220

(22) PCT Filed: Jun. 14, 2021

(86) PCT No.: PCT/JP2021/022592
§ 371 (c)(1),
(2) Date: Feb. 14, 2023

(87) PCT Pub. No.: WO2022/054357
PCT Pub. Date: Mar. 17, 2022

(65) Prior Publication Data
US 2023/0299700 A1    Sep. 21, 2023

(30) Foreign Application Priority Data
Sep. 9, 2020  (JP) .................. 2020-151558

(51) Int. Cl.
*H02P 21/16*       (2016.01)
*H02P 21/22*       (2016.01)

(52) U.S. Cl.
CPC .............. *H02P 21/16* (2016.02); *H02P 21/22* (2016.02); *H02P 2207/05* (2013.01)

(58) Field of Classification Search
CPC ....... H02P 21/16; H02P 21/22; H02P 2207/05
(Continued)

(56) References Cited

U.S. PATENT DOCUMENTS

| 5,877,603 A | * | 3/1999 | Uchida | .................. H02P 21/22 |
| | | | | 318/434 |
| 7,521,887 B2 | * | 4/2009 | Tobari | .................... H02P 21/16 |
| | | | | 318/717 |

(Continued)

FOREIGN PATENT DOCUMENTS

| JP | 11-235100 A | 8/1999 |
| JP | 2003-164188 A | 6/2003 |

(Continued)

OTHER PUBLICATIONS

International Search Report (PCT/ISA/210) issued in PCT Application No. PCT/JP2021/022592 dated Aug. 17, 2021 with English translation (four (4) pages).

(Continued)

*Primary Examiner* — Kawing Chan
(74) *Attorney, Agent, or Firm* — Crowell & Moring LLP

(57) ABSTRACT

The present invention achieves highly accurate control characteristics by estimating an induced voltage coefficient of a magnet motor without rotary auto-tuning. A first power Pc is calculated on the basis of the output voltage and output current of the magnet motor, and a second power P^ is calculated on the basis of the electric circuit constant, current command, output frequency, and induced voltage coefficient of the magnet motor. The induced voltage coefficient is estimated so that the calculated first power follows the second power, and the driving of the magnet motor is controlled in accordance with the induced voltage coefficient.

13 Claims, 12 Drawing Sheets

(58) Field of Classification Search
USPC .................................................. 318/400.02
See application file for complete search history.

(56) References Cited

U.S. PATENT DOCUMENTS

| | | | |
|---|---|---|---|
| 2007/0126391 A1 | 6/2007 | Tobari et al. | |
| 2008/0012521 A1* | 1/2008 | Katsumata | ............. H02P 21/22 |
| | | | 318/632 |
| 2010/0207555 A1* | 8/2010 | Ide | ......................... H02P 21/32 |
| | | | 318/400.02 |

FOREIGN PATENT DOCUMENTS

| | | | | |
|---|---|---|---|---|
| JP | 2006-87263 A | 3/2006 | | |
| JP | 2007-159212 A | 6/2007 | | |
| JP | 2010-98911 A | 4/2010 | | |
| JP | 2015-177600 A | 10/2015 | | |
| WO | WO-2020261751 A1 * | 12/2020 | ............. | H02M 7/48 |
| WO | WO-2021111695 A1 * | 6/2021 | .......... | H02P 21/0017 |
| WO | WO-2021117279 A1 * | 6/2021 | .......... | H02P 21/0003 |

OTHER PUBLICATIONS

Japanese-language Written Opinion (PCT/ISA/237) issued in PCT Application No. PCT/JP2021/022592 dated Aug. 17, 2021 (five (5) pages).

Japanese-language Office Action issued in Japanese Application No. 2020-151558 dated Oct. 17, 2023 with English translation (12 pages).

* cited by examiner

F I G. 1 3
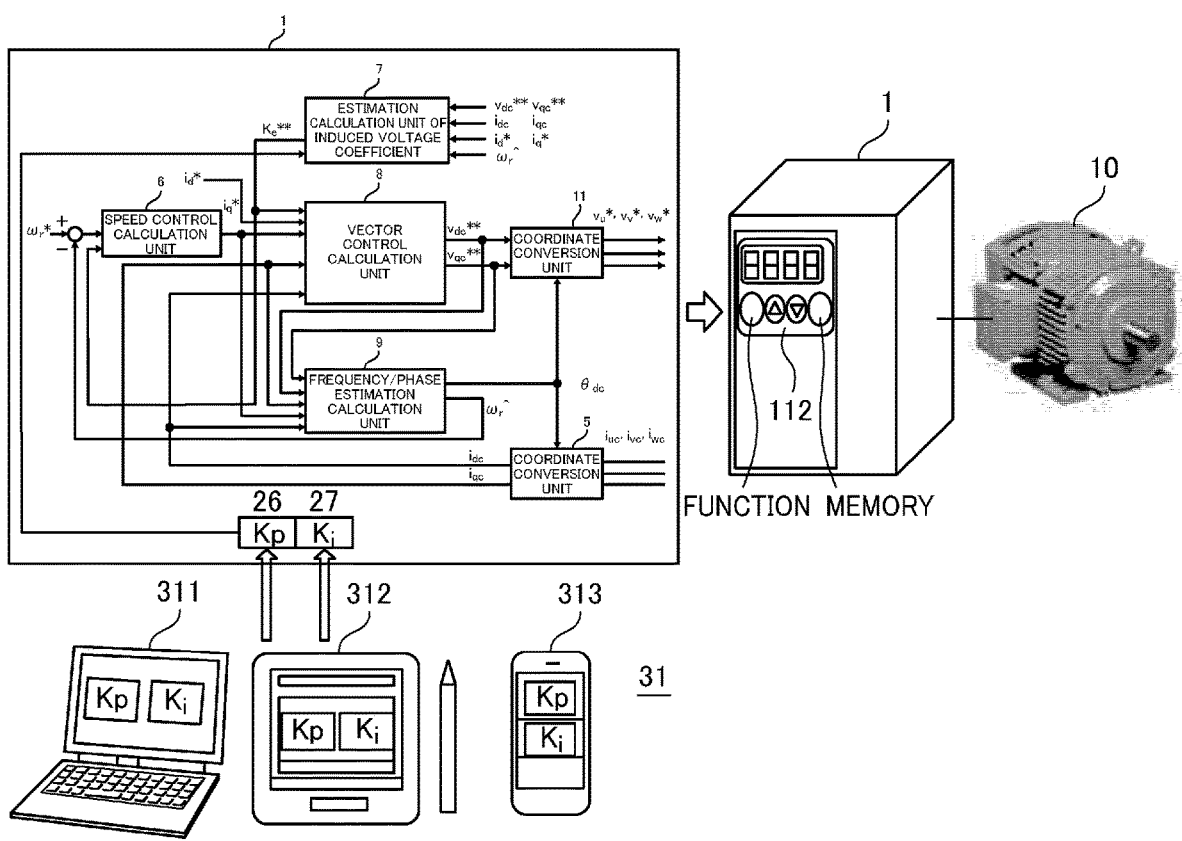

POWER CONVERSION DEVICE

TECHNICAL FIELD

The present invention relates to a power conversion device, in particular, estimation of an induced voltage coefficient for controlling the driving of a magnet motor.

BACKGROUND ART

A power conversion device that performs sensorless control with respect to a motor using a permanent magnet with a high efficiency is known. For example, in Patent Document 1, a technology is disclosed in which for highly accurate control of a magnet motor, an induced voltage coefficient of the magnet motor is estimated on the basis of a voltage command value, a current detection value, an electric circuit coefficient, and a frequency estimation value with respect to a power converter.

CITATION LIST

Patent Document

Patent Document 1: JP 2003-164188 A

SUMMARY OF THE INVENTION

Problems to be Solved by the Invention

In a control method disclosed in Patent Document 1, an induced voltage coefficient $\Phi$ is estimated on the basis of Expression (1) by using a voltage command value ($v_\gamma$, $v_\delta$) and current detection ($i_\gamma$, $i_\delta$) of a direct current amount of a component of a $\gamma$ axis that is a magnetic flux axis and a component of a $\delta$ axis that is a torque axis, and an electric circuit coefficient (resistance R, an inductance $L_d$ of a d axis, and an inductance $L_q$ of a q axis) of the magnet motor.

[Expression 1]

$$\Phi = \sqrt{(v_\gamma - Ri_\gamma + \omega_1 L_d i_\delta)^2 + (v_\delta - Ri_\delta + \omega_1 L_d i_\gamma)^2} \quad (1)$$

Here, Expression (1) is affected by a voltage drop ($w_1 L_q i_\delta$ and $w_1 L_d i_\gamma$) of the inductance, and it is considered that an estimation accuracy of the induced voltage coefficient is degraded by a setting error of the inductances $L_d$ and $L_q$.

In order to prevent the estimation accuracy from being degraded, it is necessary to rotate the magnet motor in a no-load state, and to adjust the induced voltage coefficient. Such adjustment is referred to as rotary auto-tuning (A.T). It is necessary that such adjustment work is performed before the magnet motor is installed in a mechanical device of a customer, and thus, a working time increases.

An object of the present invention is to provide a power conversion device that achieves highly accurate control characteristics by estimating an induced voltage coefficient for controlling a magnet motor without rotary auto-tuning.

Solutions to Problems

In order to attain the object described above, one preferred aspect of the present invention enables an induced voltage coefficient of a magnet motor to be estimated by using an active power or a reactive power during the actual operation of the magnet motor.

The preferred example of the present invention discloses, a power conversion device controlling a magnet motor, in which a first power is calculated on the basis of an output voltage and an output current of the magnet motor, a second power is calculated on the basis of an electric circuit coefficient, a current command, an output frequency, and an induced voltage coefficient of the magnet motor, the induced voltage coefficient is estimated so that the first power follows the second power, and driving of the magnet motor is controlled in accordance with the induced voltage coefficient.

Effects of the Invention

According to the present invention, it is possible to achieve highly accurate control characteristics by estimating the induced voltage coefficient of the magnet motor during the actual operation, without adjusting the electric circuit coefficient of the magnet motor.

BRIEF DESCRIPTION OF THE DRAWINGS

FIG. 13 is a diagram illustrating a configuration example of a magnet motor driving system according to Example 9.

MODE FOR CARRYING OUT THE INVENTION

Figure 1:
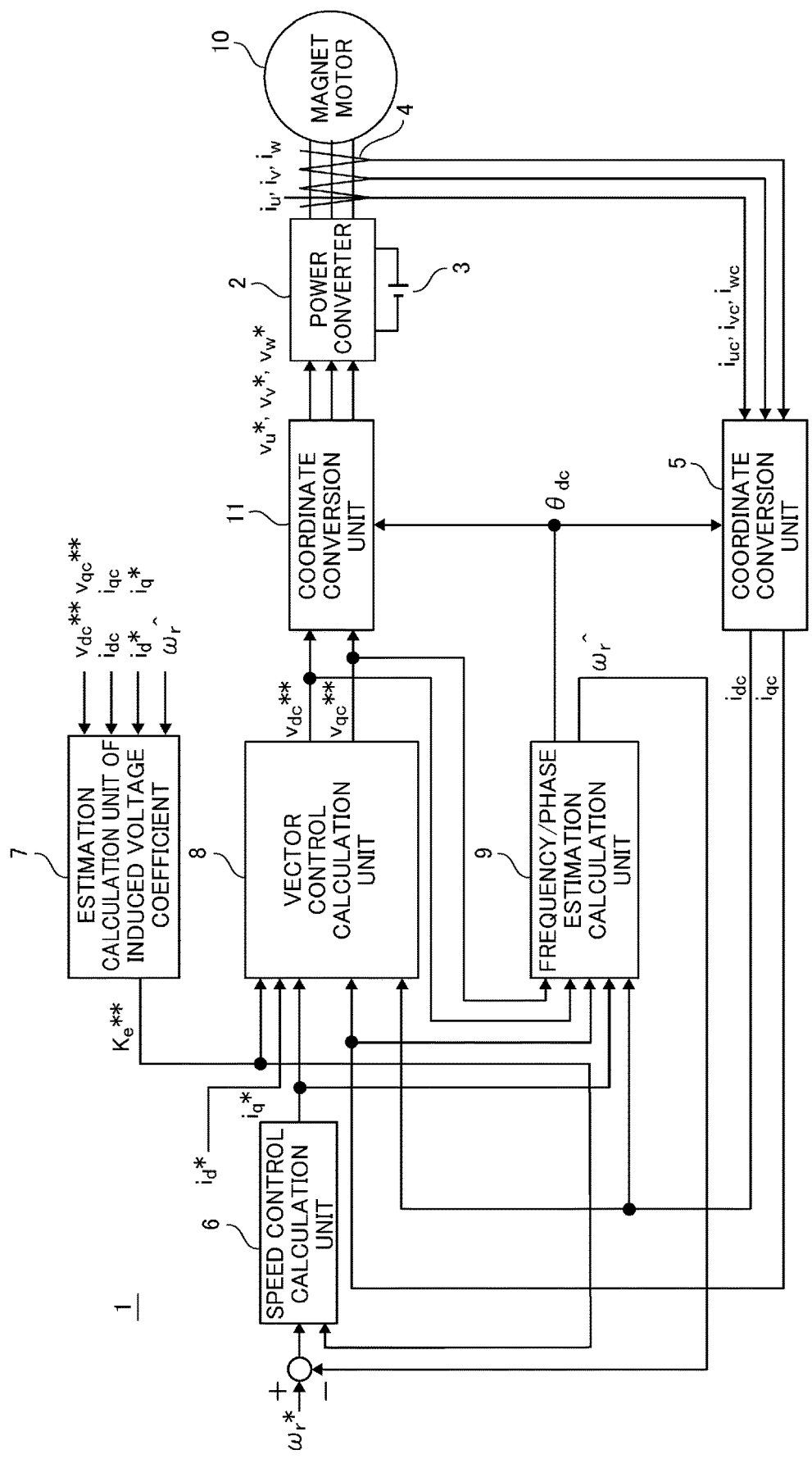
FIG. 1 is a diagram illustrating a configuration example of a power conversion device according to Example 1.

Hereinafter, some preferred examples will be described in detail by using the drawings. Note that, the same reference numerals will be applied to common configurations in each of the drawings. In addition, Examples described below are an example, and the present invention is not limited to Examples described below.

Example 1

FIG. 1 illustrates a configuration example of a power conversion device according to Example 1.

A power conversion device 1 includes a magnet motor 10, a power converter 2, a direct-current power source 3, a current detector 4, a coordinate conversion unit 5, a speed control calculation unit 6, an estimation calculation unit 7 of an estimated induced voltage coefficient, a vector control calculation unit 8, a frequency/phase estimation calculation unit 9, and a coordinate conversion unit 11. In a preferred example, the magnet motor 10, the power converter 2, the direct-current power source 3, and the current detector 4 are configured by hardware, and other constituents 5 to 11 are functions (software functions) to be achieved by executing a program in one or a plurality of processing devices (CPU). The constituents 5 to 11 may be simply referred to as a control unit or a controller.

Here, the magnet motor 10 outputs motor torque in which a torque component according to a magnetic flux of a permanent magnet and a torque component according to an inductance of an armature winding wire are synthesized.

The power converter 2 inputs a voltage command values $v_u^*$, $v_v^*$, and $v_w^*$ of a three-phase alternating current, outputs a voltage value proportional to the voltage command values $v_u^*$, $v_v^*$, and $v_w^*$, and performs variable control with respect to an output voltage value and an output frequency value of the magnet motor 10. The direct-current power source 3 supplies a direct-current voltage to the power converter 2.

The current detector 4 detects alternating-current currents $i_u$, $i_v$, and $i_w$ of three phases of the magnet motor 10, and outputs $i_{uc}$, $i_{vc}$, and $i_{wc}$, which are a detection value. Note that, the current detector 4 may detect an alternating-current current of two phases in the three phases of the induction motor 1, for example, a u phase and a w phase, and may obtain an alternating-current current of a v phase as $i_v = -(i_u + i_w)$ from an alternating-current condition ($i_u + i_v + i_w = 0$).

The coordinate conversion unit 5 detects the detection values $i_{uc}$, $i_{vc}$, and $i_{wc}$ of the alternating-current currents $i_u$, $i_v$, and $i_w$ of the three phases, and outputs current detection values $i_{dc}$ and $i_{qc}$ of a d axis and a q axis from a phase estimation value $\theta_{dc}$.

The speed control calculation unit 6 calculates a torque command value $\tau^*$, on the basis of a frequency command value $\omega_r^*$ and a frequency estimation value $\omega_r^\wedge$, and divides the torque command value by a torque coefficient to output a current command value $i_q^*$ of the q axis.

The estimation calculation unit 7 of the induced voltage coefficient calculates an estimation value $K_e^{}$ of the induced voltage coefficient, on the basis of voltage command values $v_{dc}^{}$ and $v_{qc}^{**}$, the current detection values $i_{dc}$ and $i_{qc}$, and current command values $i_{dc}^*$ and $i_{qc}^*$ of the d axis and the q axis, and the frequency estimation value $\omega_r^\wedge$, and outputs the value.

The vector control calculation unit 8 outputs the calculated the voltage command values $v_{dc}^{}$ and $v_{qc}^{}$ of the d axis and the q axis, on the basis of the estimation value $K_e^{**}$ of the induced voltage coefficient, current command values $i_d^*$ and $i_q^*$ and the current command values $i_{dc}$ and $i_{qc}$ of the d axis and the q axis, and the frequency estimation value $\omega_r^\wedge$ that is an output frequency.

The frequency/phase estimation calculation unit 9 calculates an estimation value of a phase error A that is a deviation between the rotation phase estimation value $\theta_{dc}$ and an actual rotation phase $\theta_d$ of the power converter 2 by using the voltage command values $v_{dc}^{}$ and $v_{qc}^{}$ of a $d_c$ axis and a qc axis, which are a control axis, the inductance value $L_q^*$ of the q axis, the frequency estimation value $\omega_r^\wedge$, the current detection values $i_{dc}$ and $i_{qc}$, and an electric circuit coefficient of the permanent magnet motor 10, and outputs the frequency estimation value $\omega_r^\wedge$ and the phase estimation value $\theta_{dc}$, on the basis of the estimation value.

The coordinate conversion unit 11 outputs the voltage command values $v_u^*$, $v_v^*$, and $v_w^*$ of the three-phase alternating current from the voltage command values $v_{dc}^*$ and $v_{qc}^{**}$ of the d axis and the q axis, and the phase estimation value $\theta_{dc}$.

First, a basic operation of a sensorless vector control method in the case of using the estimation calculation unit 7 of the induced voltage coefficient that is the feature of this example will be described.

The speed control calculation unit 6 calculates the torque command $\tau^*$ and the current command value $i_q^*$ of the q axis, in accordance with Expression (2), by proportional control and integration control so that the frequency estimation value $\omega_r^\wedge$ follows the frequency command value $\omega_r^*$.

[Expression 2]

$$\begin{aligned} \tau^* &= (\omega_r^* - \omega_r^\wedge)\left(K_{sp} + \frac{K_{si}}{s}\right) \\ i_q^* &= \frac{\tau^*}{3/2 P_m[K_e^{**} + (L_d - L_q)i_d^*]} \end{aligned} \quad (2)$$

Here, $K_{sp}$: Proportional Gain of Speed Control, $K_{si}$: Integration Gain of Speed Control, $P_m$: Number of Electrode Pairs First, the vector control calculation unit 8 outputs voltage reference values $v_{dc}^*$ and $v_{qc}^*$ of the d axis and the q axis, in accordance with Expression (3), by using a resistance setting value $R^*$, an inductance setting value $L_d^*$ of the d axis, and an inductance setting value $L_q^*$ of the q axis, which are the electric circuit coefficient of the magnet motor 10, a value $K_e^*$ of the induced voltage coefficient, the current command values $i_d^*$ and $i_q^*$ of the d axis and the q axis, and the frequency estimation value $\omega_r^\wedge$.

[Expression 3]

$$\begin{bmatrix} v_{dc}^* = R^* i_d^* - \omega_r^\wedge L_q^* \dfrac{1}{1 + T_{acr} s} i_q^* \\ v_{qc}^* = R^* i_q^* + \omega_r^\wedge \left( L_d^* \dfrac{1}{1 + T_{acr} s} i_d^* + K_e^{**} \right) \end{bmatrix} \quad (3)$$

Here, $T_{acr}$: Response Time Coefficient of Current Control

Second, voltage correction values $\Delta v_{dc}$ and $\Delta v_{qc}$ of the d axis and the q axis are calculated in accordance with Expression (4) by the proportional control and the integration control so that the current detection values $i_{dc}$ and $i_{qc}$ of each component follows the current command values $i_d^*$ and $i_q^*$ of the d axis and the q axis.

[Expression 4]

$$\begin{bmatrix} \Delta v_{dc} = \left(K_{pd} + \dfrac{K_{id}}{s}\right)(i_d^* - i_{dc}) \\ \Delta v_{qc} = \left(K_{pq} + \dfrac{K_{iq}}{s}\right)(i_q^* - i_{qc}) \end{bmatrix} \quad (4)$$

$K_{pd}$: Proportional Gain of Current Control of d Axis, $K_{id}$: Integration Gain of Current Control of d Axis $K_{pq}$: Proportional Gain of Current Control of q Axis, $K_{iq}$: Integration Gain of Current Control of q Axis Further, the voltage command values $v_{dc}^{}$ and $v_{qc}^{}$ of the d axis and the q axis are calculated in accordance with Expression (5).

[Expression 5]

$$\begin{bmatrix} v_{dc}^{**} = v_{dc}^* + \Delta v_{dc} \\ v_{qc}^{**} = v_{qc}^* + \Delta v_{qc} \end{bmatrix} \quad (5)$$

In the frequency/phase estimation calculation unit 9, a phase error estimation value $\Delta\theta c$ is calculated in accordance with Expression (6), the frequency estimation value $\omega_r\hat{}$ is calculated in accordance with Expression (7), and the phase estimation value $\theta_{dc}$ is calculated in accordance with Expression (8), on the basis of the voltage command values $v_{dc}^{}$ and $v_{qc}^{}$ and the current detection values $i_{dc}$ and $i_{qc}$ of the d axis and the q axis, and the electric circuit coefficient of the magnet motor 10.

[Expression 6]

$$\Delta\theta c = \tan^{-1}\left(\frac{v_{dc}^{**} - R^* i_{dc} + \omega_r\hat{} L_q^* i_{qc}}{v_{qc}^{**} - R^* i_{qc} - \omega_r\hat{} L_q^* i_{dc}}\right) \quad (6)$$

[Expression 7]

$$\omega_r\hat{} = \left(Kp_{pll} + \frac{Ki_{pll}}{s}\right)(0 - \Delta\theta_c) \quad (7)$$

[Expression 8]

$$\theta dc = \frac{1}{s} \cdot \omega_r\hat{} \quad (8)$$

Figure 2:
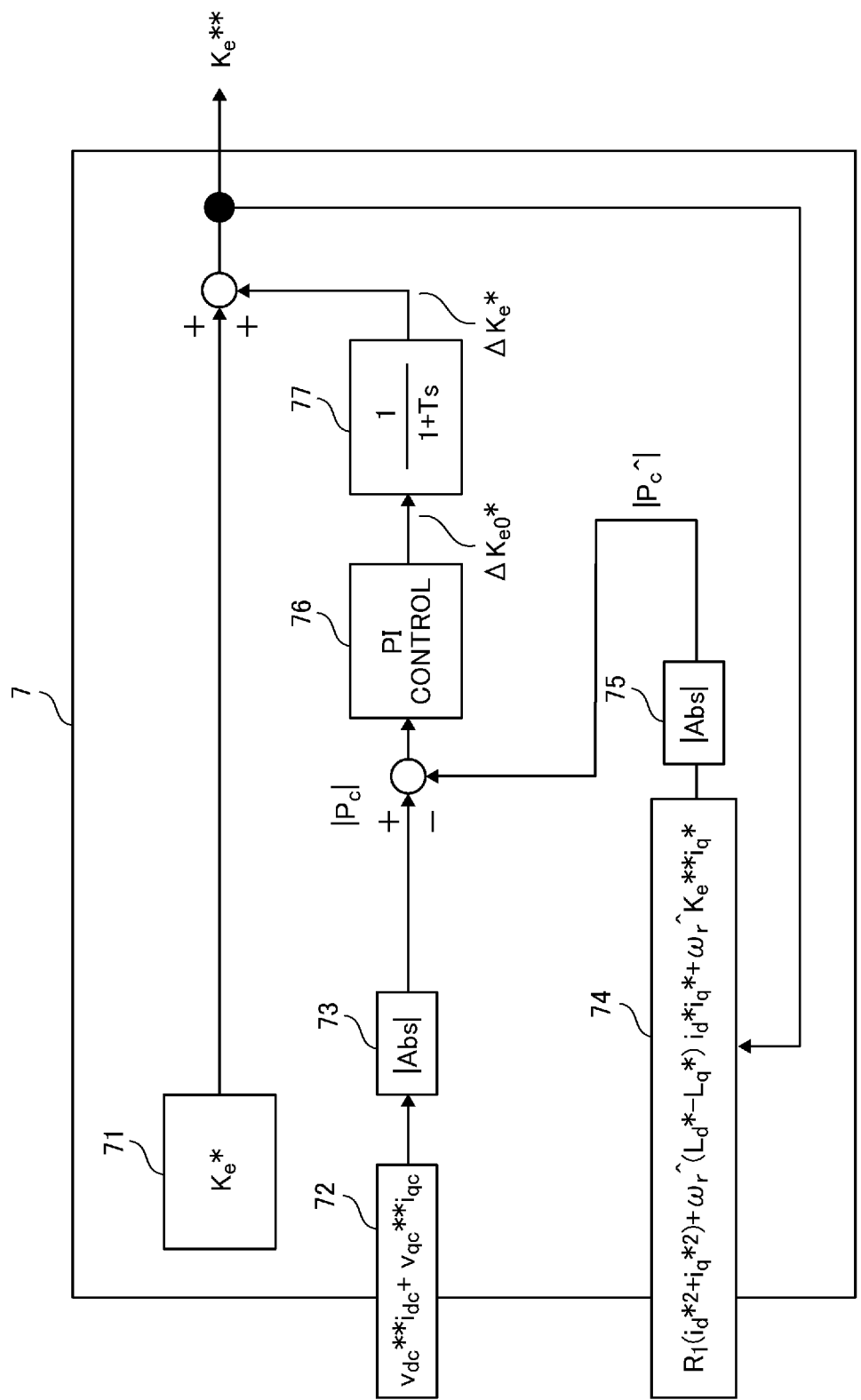
FIG. 2 is a diagram illustrating an example of an estimation calculation unit 7 of an induced voltage coefficient.

Here, $Kp_{p11}$: Proportional Gain of PLL Control, $Ki_{p11}$: Integration Gain of PLL Control FIG. 2 illustrates a configuration example of the estimation calculation unit 7 of the induced voltage coefficient in Example 1.

An initial value 71 of the induced voltage coefficient is $K_e^*$. A first active power calculation unit 72 calculates a first active power $P_c$, in accordance with Expression (9), by using the voltage command values $v_{dc}^{}$ and $v_{qc}^{}$ of the d axis and the q axis, and the current detection values $i_{dc}$ and $i_{qc}$ of the d axis and the q axis.

[Expression 9]

$$P_c = v_{dc}^{} i_{dc} + v_{qc}^{} i_{qc} \quad (9)$$

In order to respond to both powering/regenerating operation modes, the output of the first active power calculation unit 72 is sent to an absolute value calculation unit 73, and an absolute value $|P_c|$ of the first active power $P_c$ is calculated.

The second active power calculation unit 74 calculates a second active power $P_c\hat{}$, in accordance with Expression (10), by using the current command values $i_d^*$ and $i_q^*$ of the d axis and the q axis, the frequency estimation value $\omega_r\hat{}$, R, $L_d$, and $L_q$, which are the electric circuit coefficient of the magnet motor 10, and the estimation value $K_e^{**}$ of the induced voltage coefficient.

[Expression 10]

$$P_c\hat{} = R(i_d^{*2} + i_q^{*2}) + (L_d^* - L_q^*) i_d^* i_q^* + \omega_r\hat{} K_e^{**} i_q^* \quad (10)$$

In order to respond to both the powering/regenerating operation modes, the output of the second active power calculation unit 74 is sent to an absolute value calculation unit 75, and an absolute value $|P_c\hat{}|$ of the second active power $P_c\hat{}$ is calculated.

A PI control unit 76 performs Proportional (P)+Integration (I) Control so that the absolute value $|P_c|$ of the first active power $P_c$ follows the absolute value $|P_c\hat{}|$ of the second active power $P_c\hat{}$, and calculates a correction value $\Delta K_{e0}^*$ of the induced voltage coefficient.

A lowpass filter (L.P.F) 77 has a gain with a time coefficient of T, in which the correction value $\Delta K_{e0}^*$ of the induced voltage coefficient is input, and a correction value $\Delta K_{e0}^*$ is output. The estimation value $K_e^{**}$ of the induced voltage coefficient is calculated in accordance with Expression (11) by using the correction value $\Delta K_e^*$ and the initial value $K_e^*$ of the induced voltage coefficient.

[Expression 11]

$$K_e^{**} = \Delta K_e^* + K_e^* \quad (11)$$

Figure 3:
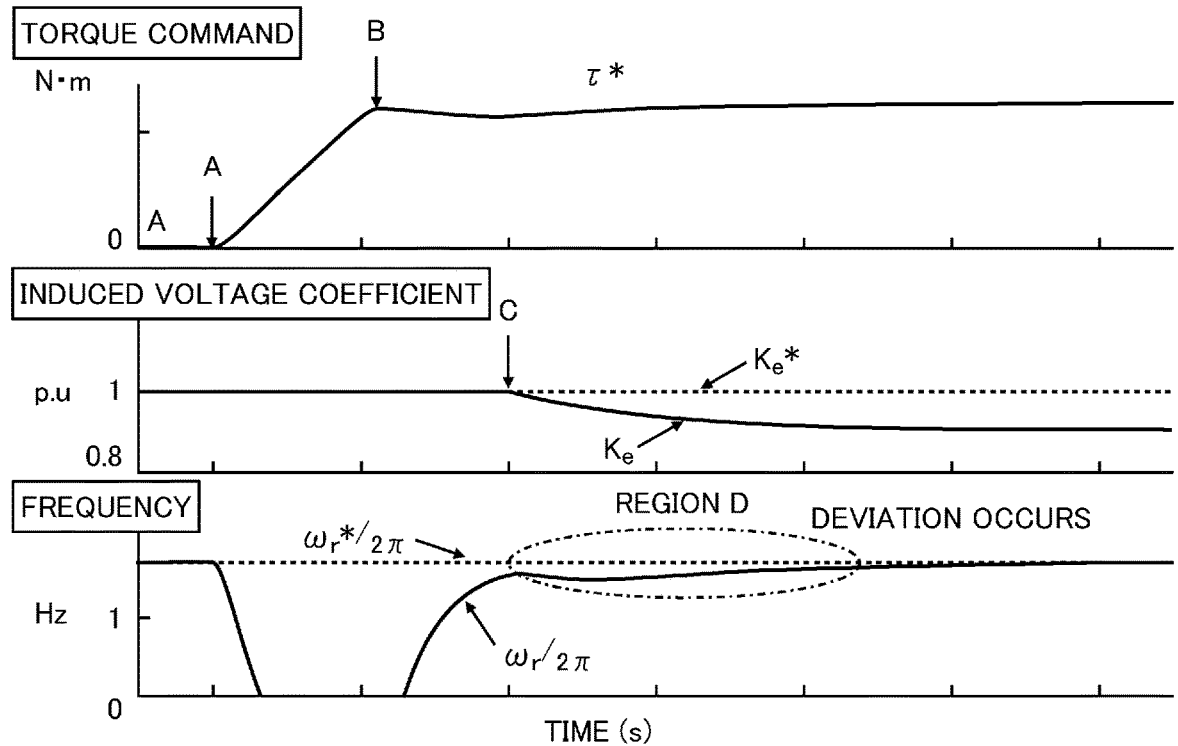
FIG. 3 is a diagram illustrating control characteristics in the case of using a power conversion device according to a comparative example.

Next, highly accurate control characteristics (FIG. 4) that are achieved by this example will be described by using a comparative example (FIG. 3).

FIG. 3 illustrates control characteristics in the case of the comparative example not using the estimation calculation unit 7 of the induced voltage coefficient according to this example (that is, $\Delta K_e^* = 0$).

A simulation result in a case where there is an error in the setting value $K_e^*$ that is included in a calculation expression of the torque command value $\tau^*$ and the current command value $i_q^*$ of the q axis, represented in Expression (2), and the voltage command values $v_{dc}^{}$ and $v_{qc}^{}$ of the d axis and the q axis, represented in Expression (5) is illustrated.

The upper side represents the torque command value $\tau^*$, the middle side represents the frequency command $\omega_r^*$ and a frequency $\omega_r$ of the magnet motor, and the lower side represents the induced voltage coefficient $K_e$ and the setting value $K_e^*$ thereof.

In FIG. 3, a case is assumed in which ramp-shaped load torque starts to be exerted from a time point A and is changed until a time point B, and the induced voltage coefficient $K_e$ slowly decreases from a point C by heat production due to a current. After passing the point B (the right side), the torque is being exerted. In a region D of the drawing, it is found that a deviation occurs between a frequency $\omega_r/2p$ of the magnet motor and a command value $\omega_r^*/2\pi$.

On the other hand, in this example, the first active power $P_c$ not including information of the setting value $K_e^*$ of the induced voltage coefficient is calculated by Expression (9) using the voltage command values $v_{dc}^*$ and $v_{qc}^*$ and the current detection values $i_{dc}$ and $i_{qc}$ of the d axis and the q axis. Further, the second active power $P_c\hat{}$ is calculated by Expression (10) using the current command values $i_d^*$ and $i_q^*$ of the d axis and the q axis, the frequency estimation value $\omega_r\hat{}$, the electric circuit coefficients R, $L_d$, and $L_q$ of the magnet motor, and the estimation value $K_e^{**}$ of the induced voltage coefficient.

By automatically adjusting the estimation value $K_e^{}$ of the induced voltage coefficient so that the absolute value $|P_c\hat{}|$ of the second active power $P_c\hat{}$ follows the absolute value $|P_c|$ of the first active power Pc, and by using the estimation value $K_e^{}$ in the speed control calculation unit 6 and the vector control calculation unit 8, it is possible to improve the control characteristics to be highly accurate.

Figure 4:
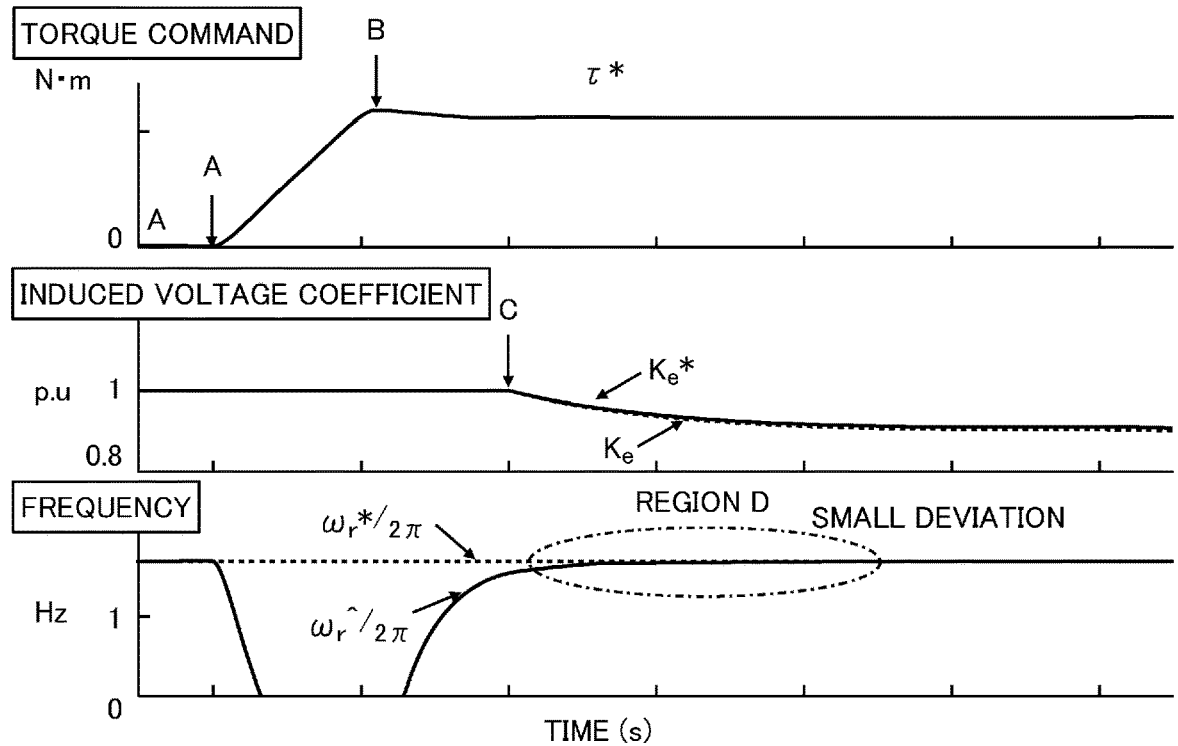
FIG. 4 is a diagram illustrating control characteristics in the case of using the power conversion device according to Example 1.

FIG. 4 illustrates the control characteristics according to this example.

In this example, the same load torque as that of the comparative example in FIG. 3 is exerted by operating the estimation calculation unit 7 of the induced voltage coefficient. Since the induced voltage coefficient $K_e$ is estimated with a high accuracy ($K_e \cong K_e^{**}$), even in the region D of the drawing, it is found that a frequency deviation ($\omega_r/2p-\omega_r\hat{}/2p$) is small, and highly accurate control characteristics are obtained.

<Check of Control Characteristics>

Figure 5:
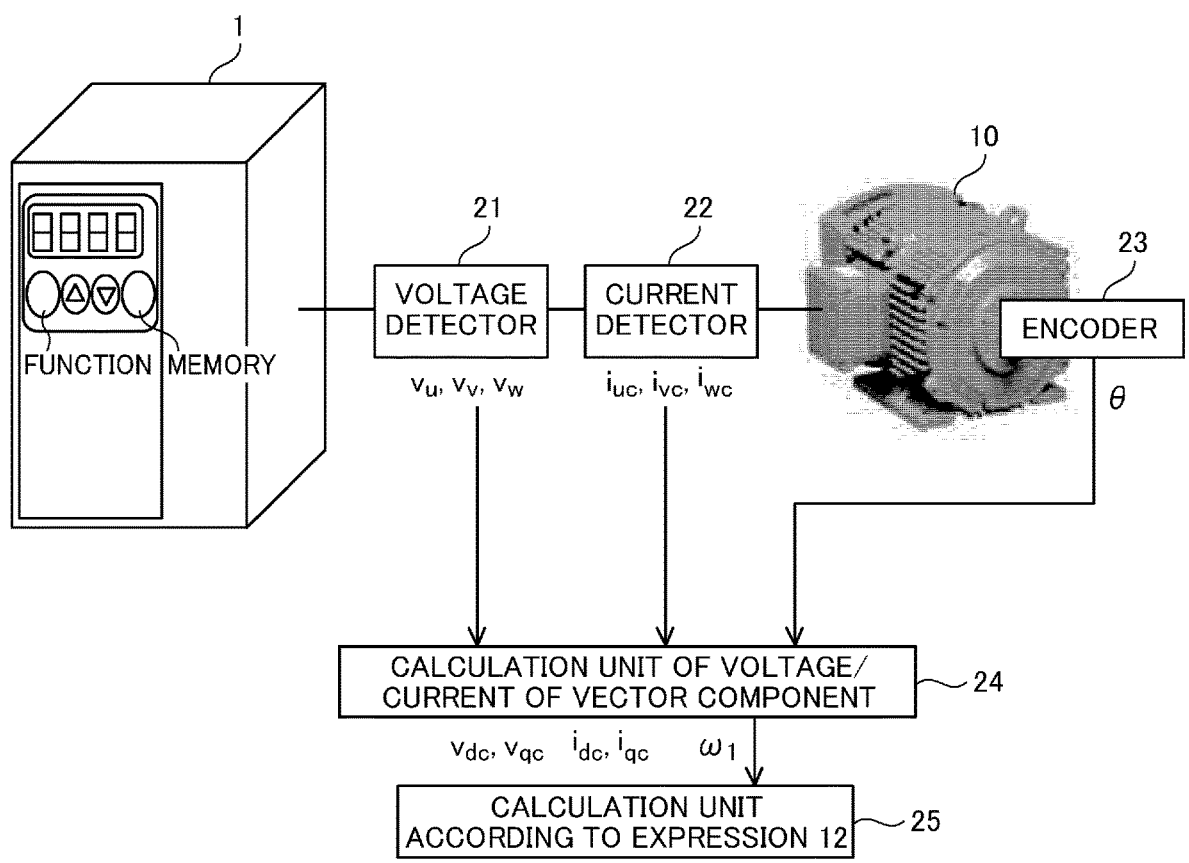
FIG. 5 is a diagram illustrating a configuration example of a magnet motor driving system that is used for checking the control characteristics of the power conversion device according to Example 1.

Next, the check of the control characteristics according to this example will be described by using FIG. 5.

A voltage detector 21 and a current detector 22 are connected to the power conversion device 1 driving the magnet motor 10, and an encoder 23 is attached to the shaft of the magnet motor 10. Further, for example, a personal computer (PC) is connected to the voltage detector 21, the current detector 22, and the encoder 23, each detection value thereof is acquired, and a program is executed to perform processing. Such processing mainly executes the processing of a calculation unit 24 of a vector voltage/current component, and the processing of a calculation unit 25 according to Expression 12.

That is, the calculation unit 24 of the vector voltage/current component receives the voltage detection values ($v_{uc}$, $v_{vc}$, and $v_{wc}$) of the three-phase alternating current, which are the output of the voltage detector 21, the current detection values ($i_{uc}$, $i_{vc}$, and $i_{wc}$) of the three-phase alternating current, and a position θ, which is the output of the encoder, and calculates a detection value $\omega_{rc}$ obtained by differentiating $v_{dc}$ and $v_{qc}$, which are the vector voltage component, $i_{dc}$ and $i_{qc}$, which are the vector current component, and the position θ.

The calculation unit 25 calculates the estimation value $K_e\hat{}$ of the induced voltage coefficient by using Expression (12).

[Expression 12]

$$K_e\hat{} = \left|\frac{v_{dc}i_{dc} + v_{qc}i_{qc} - R^*(i_{dc}^2 + i_{qc}^2)}{\omega_{rc}i_{qc}}\right| \quad (12)$$

It is found that even in a case where the induced voltage coefficient $K_e^*$ set in the controller of the power converter 2 is shifted (changed), the magnitude of the induced voltage coefficient $K_e\hat{}$ is accurately detected without being changed. By displaying the value of the induced voltage coefficient $K_e\hat{}$ with respect to the induced voltage coefficient $K_e^*$, or a graph representing the progress of such coefficients on the screen of the PC, the effect of the control characteristics according to this example can be checked.

Note that, in this example, the frequency estimation value $\omega_r\hat{}$ is calculated, but the encoder may be attached to the magnet motor 10 to detect the frequency $\omega_{rc}$.

According to this example, even in a case where there is an error in the inductance setting values $L_d^*$ and $L_q^*$ of the d axis and the q axis, the sensitivity of the second component of Expression (10) is lowered when the current command value $i_d^*$ of the d axis is set close to zero, and thus, highly accurate control characteristics can be achieved regardless of the powering/regenerating operation modes.

Example 2

Figure 6:
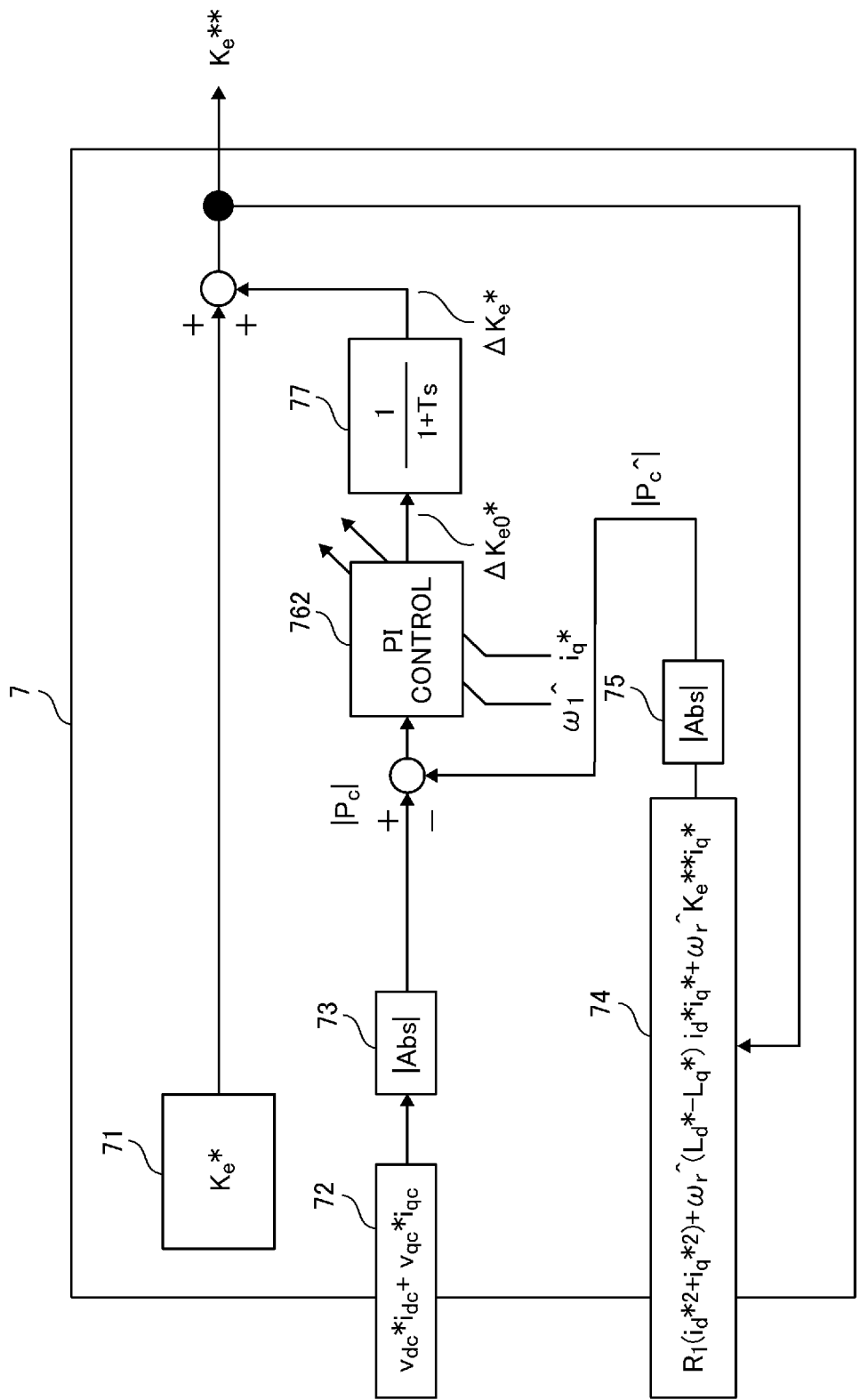
FIG. 6 is a diagram illustrating an example of an estimation calculation unit of an induced voltage coefficient according to Example 2.

A power conversion device according to Example 2 described with reference to FIG. 6. FIG. 6 illustrates an example of the estimation calculation unit 7 of the induced voltage coefficient.

In Example 1, gains ($K_p$ and $K_i$) of the proportional control and the integration control are set as a fixed value, in the estimation calculation unit 7 of the induced voltage coefficient. On the other hand, in Example 2, the gains ($K_p$ and $K_i$) are changed in accordance with the frequency estimation value $\omega_r\hat{}$ or the current command value $i_q^*$ of the q axis.

The estimation calculation unit 7 of the induced voltage coefficient, illustrated in FIG. 6, has the same configuration as that of the estimation calculation unit 7 of the induced voltage coefficient of Example 1 (FIG. 2). An input value and an output value of PI control 762 are different from those of Example 1, but the other constituents are the same as those in FIG. 2.

In Example 2, in the PI control 762, by changing the gains ($K_p$ and $K_i$) of the proportional control and the integration control approximately in proportion to the frequency estimation value $\omega_r\hat{}$ or the current command value $i_q^*$ of the q axis, the absolute value $|P_c|$ of the first active power $P_c$ is changed to the absolute value $|P_c\hat{}|$ of the second active power $P_c\hat{}$, in accordance with the frequency or the current value. Accordingly, highly accurate control characteristics can be achieved in a shorter period of time from a low speed region to a high speed region and from a light load to a heavy load.

Example 3

Figure 7:
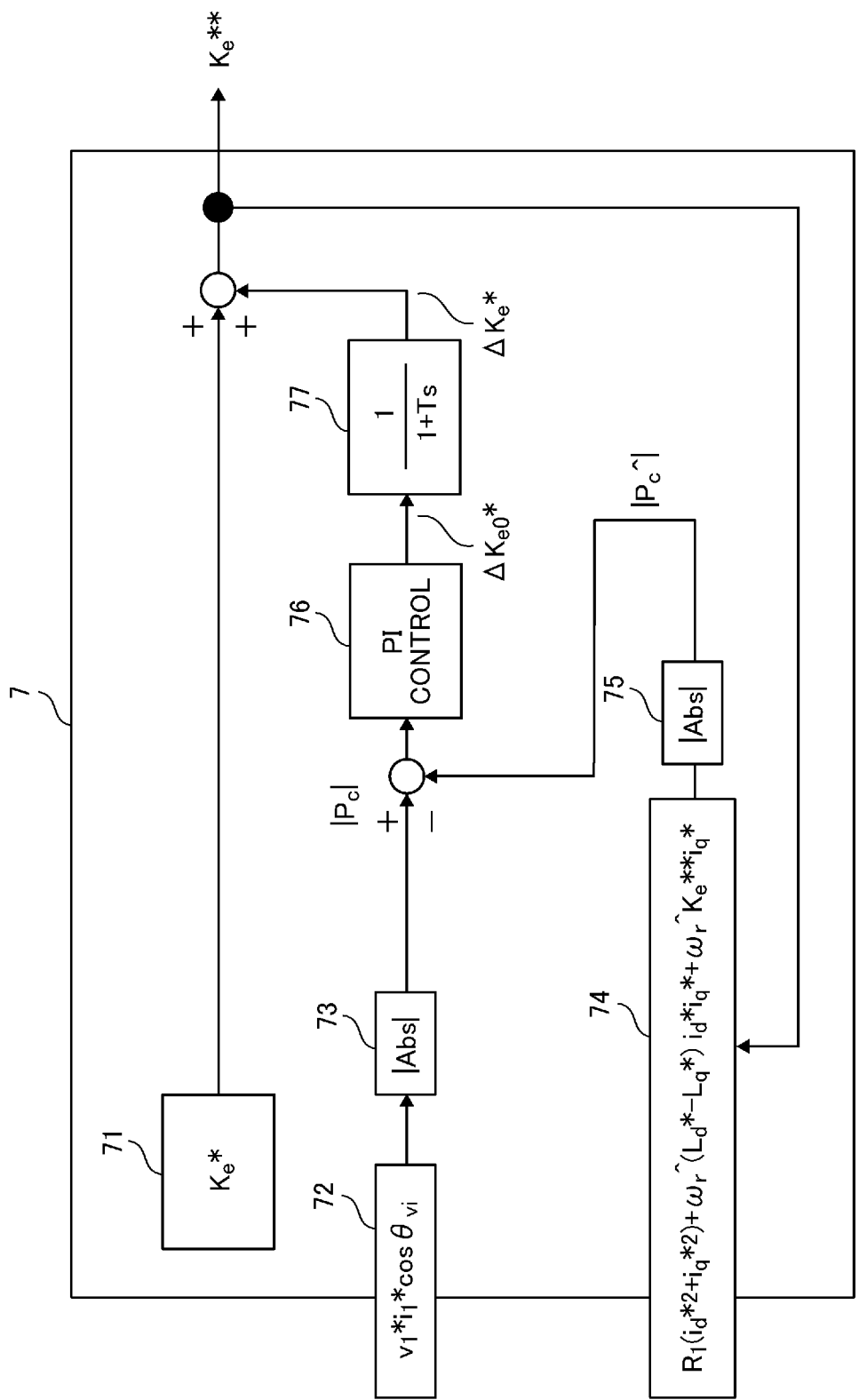
FIG. 7 is a diagram illustrating an example of an estimation calculation unit of an induced voltage coefficient according to Example 3.

A power conversion device according to Example 3 will be described with reference to FIG. 7. FIG. 7 illustrates an example of the estimation calculation unit 7 of the induced voltage coefficient.

In Example 1, the first active power $P_c$ is calculated from the voltage command values $v_{dc}^{}$ and $v_{qc}^{}$ and the current detection values $i_{dc}$ and $i_{qc}$ of the d axis and the q axis. On the other hand, in Example 3, the active power $P_c$ is calculated by using an amplitude value $V_1^*$ of a voltage command and an amplitude value $i_1$ of current detection of the three-phase alternating current, and a cosine signal of a phase $\theta_{vi}$.

The estimation calculation unit 7 of the induced voltage coefficient, illustrated in FIG. 7 has the same configuration as that of the estimation calculation unit 7 of the induced voltage coefficient of Example 1 (FIG. 2). The calculation of a first active power calculation unit 723 is different from that of Example 1, but the other constituents are the same as those in FIG. 2. That is, in the first active power calculation unit 723 of FIG. 7, the amplitude value $V_1^*$ of the voltage command of the three-phase alternating current is obtained by Expression (13), the amplitude value $i_1$ of the current detection value is obtained by Expression (14), and the phase $\theta_{vi}$ is obtained by Expression (15), and the active power $P_c$ is calculated by using Expression (16).

[Expression 13]

$$v_1^* = \sqrt{v_{dc}^{} + v_{qc}^{}} \quad (13)$$

[Expression 14]

$$i_1 = \sqrt{i_{dc}^2 + i_{qc}^2} \quad (14)$$

[Expression 15]

$$\theta_{vi} = \tan^{-1}\left[-\frac{v_{dc}}{v_{qc}}\right] + \tan^{-1}\left[-\frac{i_{dc}}{i_{qc}}\right] \quad (15)$$

-continued

[Expression 16]

$$P_c = v_1^* i_1 \cos[\theta_{vi}] \tag{16}$$

According to Example 3, as with Example 1, highly accurate control characteristics can be achieved.

Example 4

Figure 8:
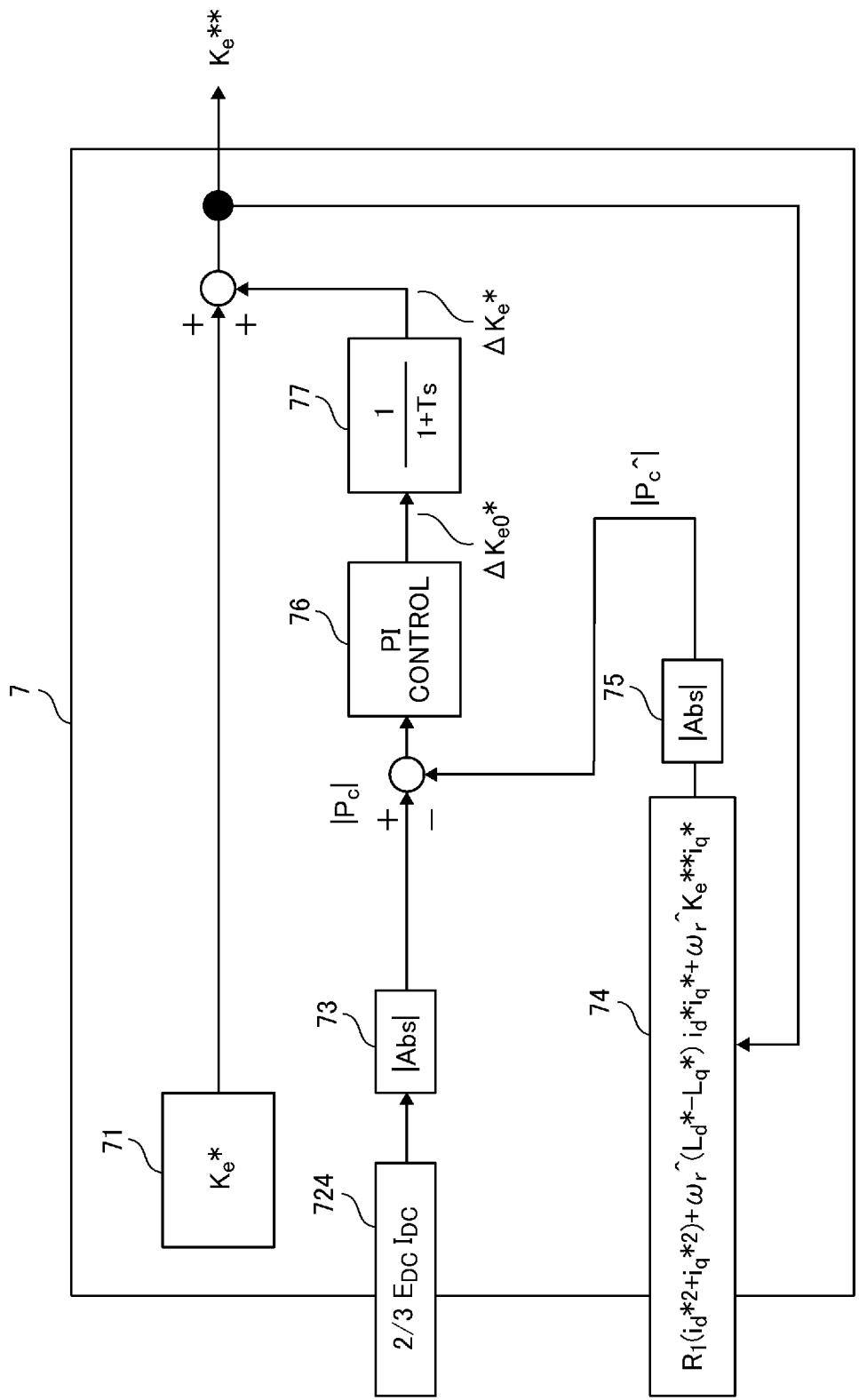
FIG. 8 is a diagram illustrating an example of an estimation calculation unit of an induced voltage coefficient according to Example 4.

A power conversion device according to Example 4 will be described with reference to FIG. 8. FIG. 8 illustrates an example of the estimation calculation unit 7 of the induced voltage coefficient.

In Example 1, the first active power $P_c$ is calculated from the voltage command values $v_{dc}^{}$ and $v_{qc}^{}$ and the current detection values $i_{dc}$ and $i_{qc}$ of the d axis and the q axis, but in Example 4, the active power $P_c$ is calculated by using a direct-current voltage value $E_{DC}$ and a direct-current current value $I_{DC}$ of the power converter 2.

The estimation calculation unit 7 of the induced voltage coefficient, illustrated in FIG. 8, has the same configuration as that of the estimation calculation unit 7 of the induced voltage coefficient of Example 1 (FIG. 2). The calculation of a first active power calculation unit 724 is different from that of Example 1, but the other constituents are the same as those in FIG. 2. That is, in the first active power calculation unit 724 of FIG. 8, the first active power $P_c$ is calculated on the basis of Expression (17) by using the direct-current voltage detection value $E_{DC}$ and the direct-current current detection value $I_{DC}$ of the power converter 2.

[Expression 17]

$$P_c = \frac{2}{3} E_{DC} I_{DC} \tag{17}$$

According to Example 4, as with Example 1, highly accurate control characteristics can be achieved.

Example 5

Figure 9:
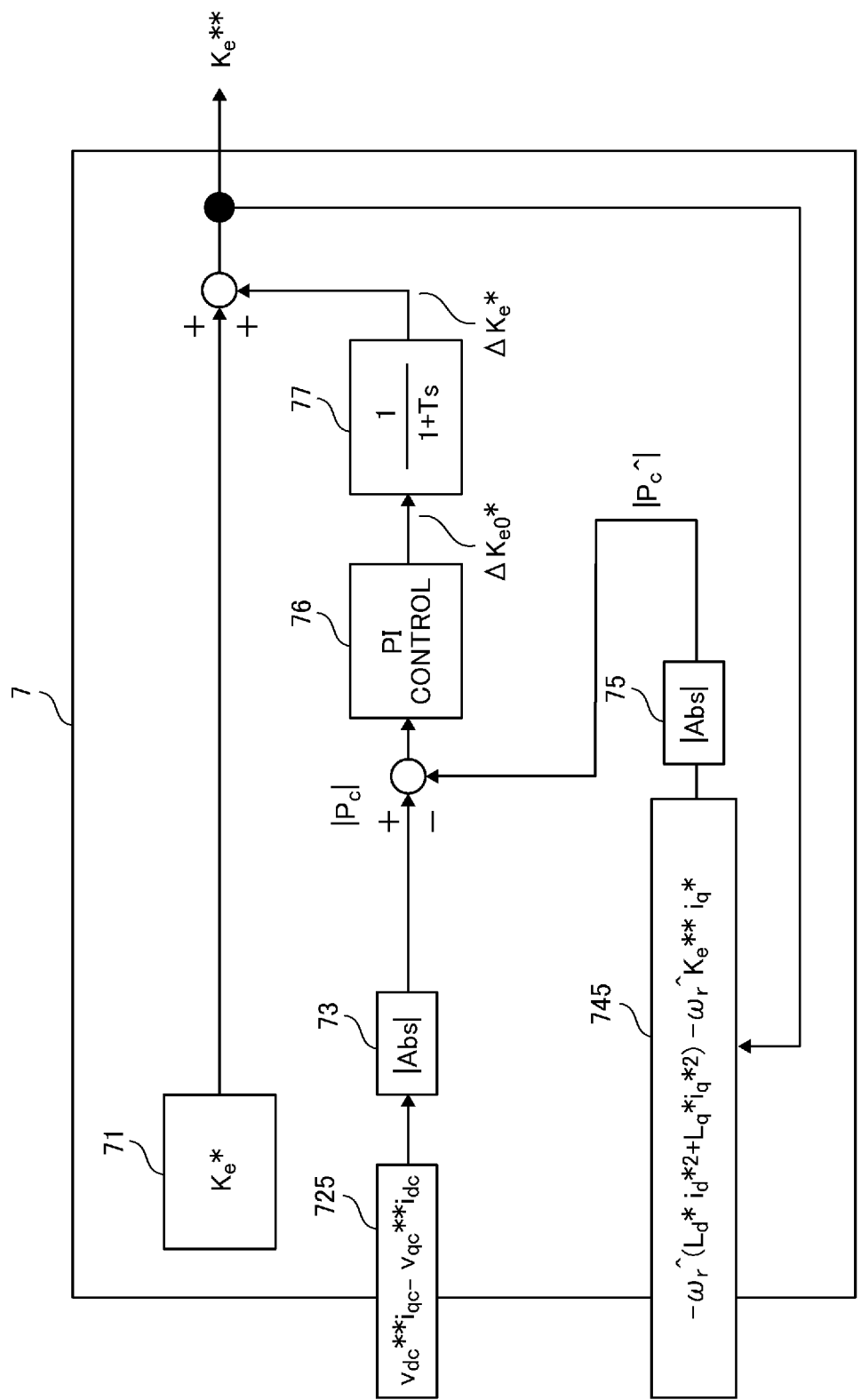
FIG. 9 is a diagram illustrating an example of an estimation calculation unit of an induced voltage coefficient according to Example 5.

A power conversion device according to Example 5 will be described with reference to FIG. 9. FIG. 9 illustrates an example of the estimation calculation unit 7 of the induced voltage coefficient.

In Example 1, two active powers of the first active power and the second active power are used, but in Example 5, two reactive powers are used.

The estimation calculation unit 7 of the induced voltage coefficient, illustrated in FIG. 9, has the same configuration as that of the estimation calculation unit 7 of the induced voltage coefficient of Example 1 (FIG. 2). The calculation of a first reactive power calculation unit 725 and a second reactive power calculation unit 745 is different from that of the first active power calculation unit 72 and the second active power calculation unit 74 of Example 1, but the other constituents are the same as those in FIG. 2. That is, the first reactive power calculation unit 725 calculates a first reactive power $Q_c$, in accordance with Expression (18), by using the voltage command values $v_{dc}^*$ and $v_{qc}^*$ and the current detection values $i_{dc}$ and $i_{qc}$ of the d axis and the q axis.

[Expression 18]

$$Q_c = v_{dc}^{} i_{qc} - v_{qc}^{} i_{dc} \tag{18}$$

In order to respond to both the powering/regenerating operation modes, the output of the first reactive power calculation unit 725 is sent to the absolute value calculation unit 73, and an absolute value $|Q_c|$ of the first reactive power $Q_c$ is calculated.

The second reactive power calculation unit 745 calculates a second reactive power $Q_c\hat{}$, in accordance with Expression (19), by using the current command values $i_{dc}^*$ and $i_{qc}^*$ of the d axis and the q axis, the frequency estimation value $\omega_r\hat{}$, R, $L_d$, and $L_q$, which are the electric circuit coefficient of the magnet motor 10, and the estimation value $K_e^{**}$ of the induced voltage coefficient.

[Expression 19]

$$Q_c\hat{} = -\omega_r\hat{}(L_d^* i_d^2 + L_q^* i_q^2) - \omega_r\hat{} K_e^{**} \tag{19}$$

In order to respond to both the powering/regenerating operation modes, the output of the second reactive power calculation unit 745 is sent to the absolute value calculation unit 75, and an absolute value $|Q_c\hat{}|$ of the second reactive power $Q_c\hat{}$ is calculated. The PI control unit 76 performs Proportional (P)+Integration (I) Control so that the absolute value $|Q_c|$ of the first reactive power $Q_c$ follows the absolute value $|Q_c\hat{}|$ of the second reactive power $Q_c\hat{}$, and calculates the correction value $\Delta K_{e0}^*$ of the induced voltage coefficient.

The L.P.F 77 has a gain with a time coefficient of T, in which the correction value $\Delta K_{e0}^*$ of the induced voltage coefficient is input, and the correction value $\Delta K_e^*$ is calculated. The estimation value $K_e^{**}$ of the induced voltage coefficient is calculated in accordance with Expression (11) by using the correction value $\Delta K_e^*$ and the setting value $K_e^*$ of the induced voltage coefficient.

According to Example 5, the setting value $K_e^*$ of the induced voltage coefficient is corrected so that the absolute value $|Q_c\hat{}|$ of the second reactive power $Q_c\hat{}$ follows the absolute value $|Q_c|$ of the first reactive power $Q_c$. Accordingly, even in a case where there is an error in the resistance setting value $R^*$, highly accurate control characteristics can be achieved regardless of the powering/regenerating operation modes.

Example 6

Figure 10:
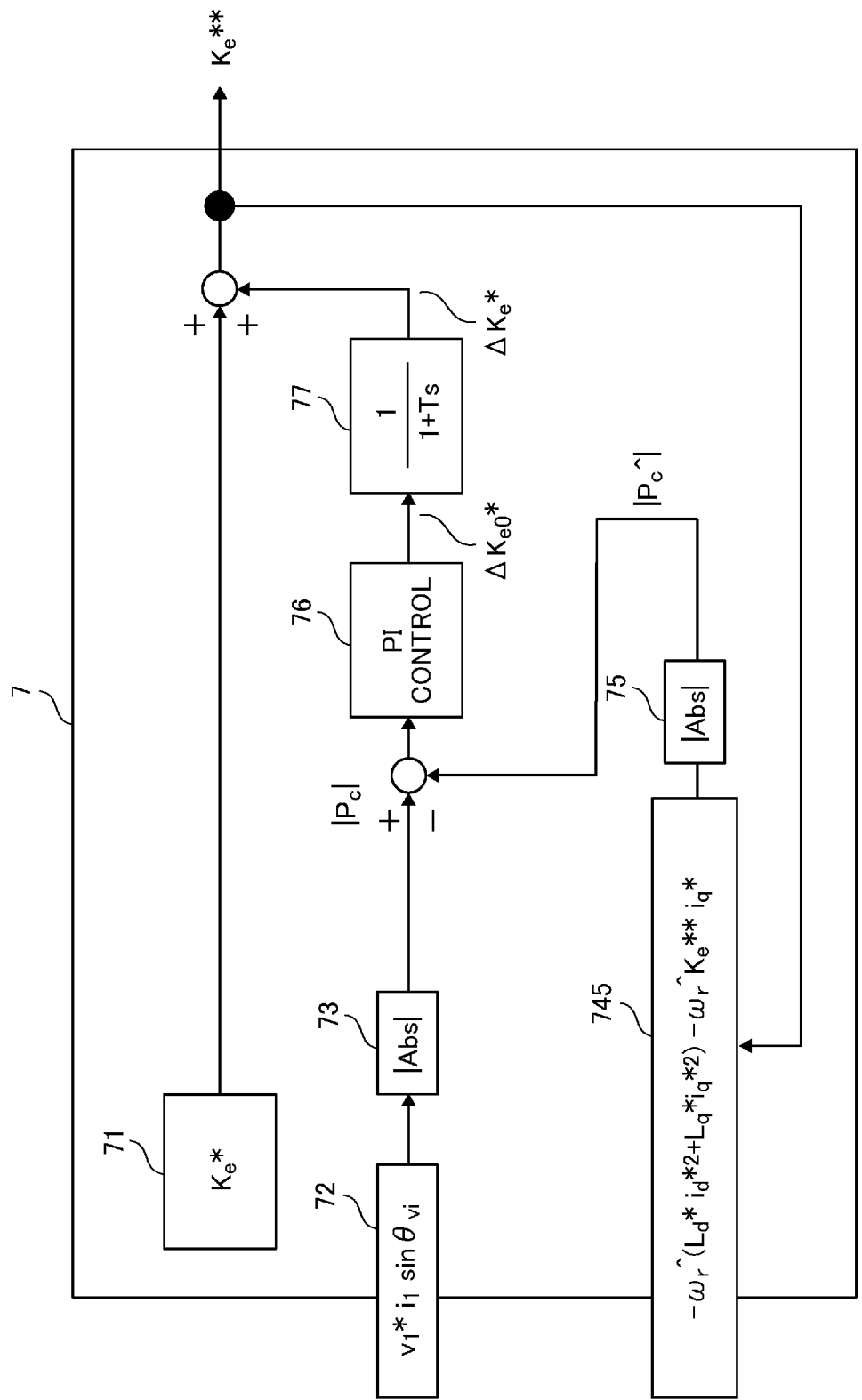
FIG. 10 is a diagram illustrating an example of an estimation calculation unit of an induced voltage coefficient according to Example 6.

A power conversion device according to Example 6 will be described with reference to FIG. 10. FIG. 10 illustrates an example of the estimation calculation unit 7 of the induced voltage coefficient.

In Example 6, the reactive power is also calculated, as with Example 5. In Example 5, the first reactive power $Q_c$ is calculated from the voltage command values $v_{dc}^{}$ and $v_{qc}^{}$ and the current detection values $i_{dc}$ and $i_{qc}$ of the d axis and the q axis, but in Example 6, the reactive power $Q_c$ is calculated by using the amplitude value $V_1^*$ of the voltage command and the amplitude value $i_1$ of the current detection of the three-phase alternating current, and the phase $\theta_{vi}$.

The estimation calculation unit 7 of the induced voltage coefficient, illustrated in FIG. 10, has the same configuration as that of the estimation calculation unit 7 of the induced voltage coefficient of Example 5 (FIG. 9). The calculation of a first reactive power calculation unit 726 is different from that of the first reactive power calculation unit 725 in Example 5, but the other constituents are the same as those in FIG. 9.

In FIG. 10, in the first reactive power calculation unit 726, the reactive power $Q_c$ is calculated by Expression (20) using the amplitude value $V_1^*$ of the voltage command of the three-phase alternating current that is calculated by Expression (13), the amplitude value it of the current detection value that is calculated by Expression (14), and a sine signal of the phase $\theta_{vi}$.

[Expression 20]

$$Q_c = v_1 * i_1 \sin[\theta_{vi}] \qquad (20)$$

According to Example 6, as with Example 5, highly accurate control characteristics can be achieved regardless of both powering/regenerating torque modes.

Example 7

Figure 11:
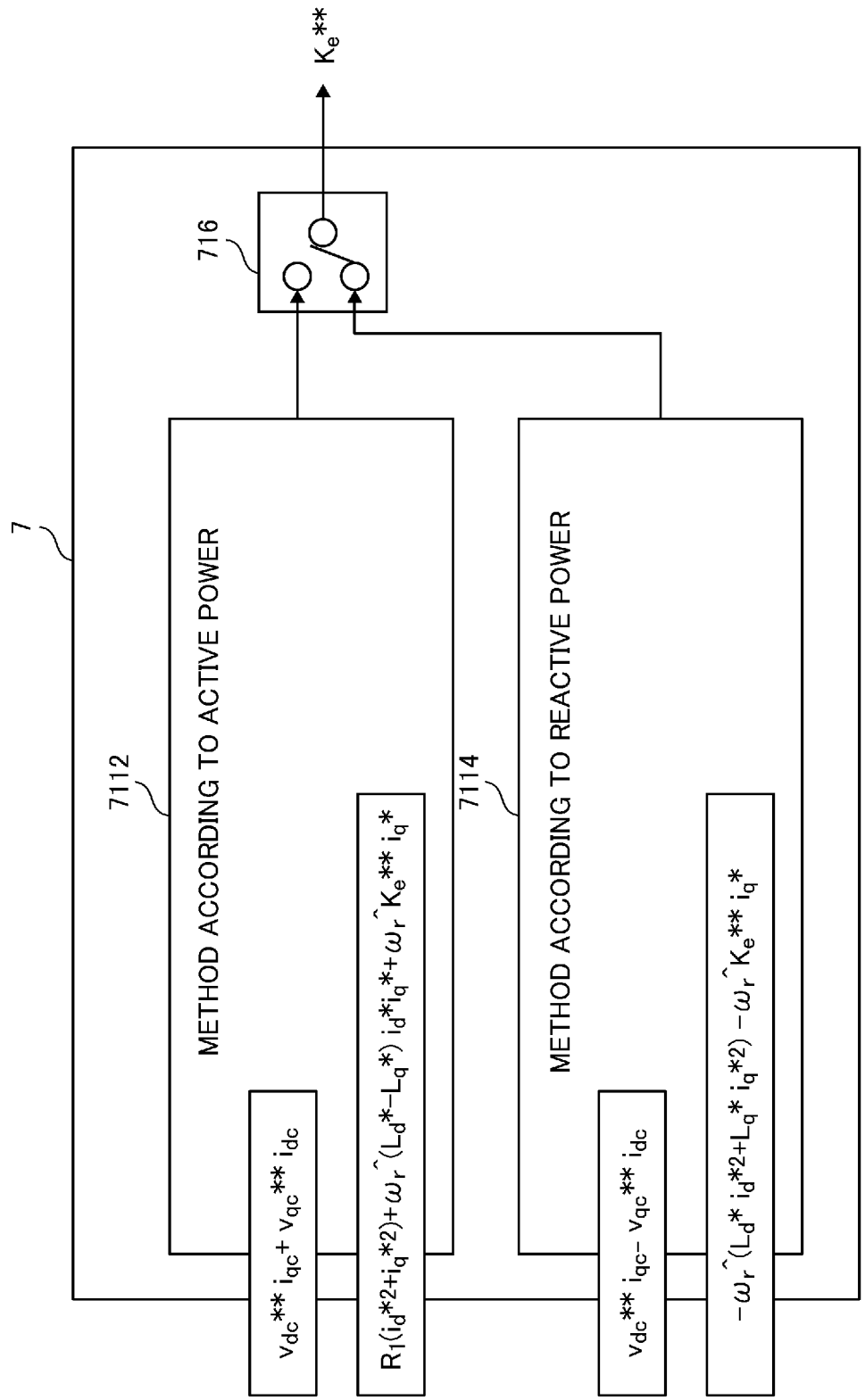
FIG. 11 is a diagram illustrating an example of an estimation calculation unit of an induced voltage coefficient according to Example 7.

A power conversion device according to Example 7 will be described with reference to FIG. 11. FIG. 11 illustrates an example of the estimation calculation unit 7 of the induced voltage coefficient.

In Examples 1 to 3, a method for calculating the active power is used, and in Examples 4 and 5, a method for calculating the reactive power is used, but in Example 7, a reactive power method is used in the low speed region, an active power method is used in the high speed region, and both methods are switched.

In FIG. 11, an estimation calculation unit 7112 of the induced voltage coefficient corresponds to the estimation calculation unit 7 of the induced voltage coefficient in Example 1 (FIG. 2), and an estimation calculation unit 7114 of the induced voltage coefficient corresponds to the estimation calculation unit 7 of the induced voltage coefficient in Example 5 (FIG. 9). Note that, FIG. 11 mainly illustrates the first active power calculation unit 72 and the second active power calculation unit 74, and the first reactive power calculation unit 725 and the second reactive power calculation unit 745, in the estimation calculation unit 7 of the induced voltage coefficient, and does not illustrate the other constituents.

A switch 716 selects an output signal of the estimation calculation unit 7114 of the induced voltage coefficient in the low speed region, selects an output signal of the estimation calculation unit 7112 of the induced voltage coefficient in a medium-high speed region, and outputs each output signal as the estimation value $K_e^{**}$ of the induced voltage coefficient. In such a switching operation, for example, a case where Expression (21) is satisfied is determined as the medium-high speed region, and a case where Expression (21) is not satisfied is determined as the low speed region, by using the electric circuit coefficient of the magnet motor 10 and the frequency estimation value $\hat{\omega}_r$.

[Expression 21]

$$R^* \ll \hat{\omega}_r \frac{(L_d^* + L_q^*)}{2} \qquad (21)$$

According to Example 7, the sensitivity of the low speed region can be lowered by the setting error of resistance (that is, since the resistance is not included in Expression (19)). The sensitivity of the medium-high speed region can be lowered by the setting error of the inductance (that is, since an inductance difference $(L_d^* - L_q^*)$ of Expression (10) decreases). Accordingly, in all the speed regions, highly accurate control characteristics can be achieved.

Example 8

Figure 12:
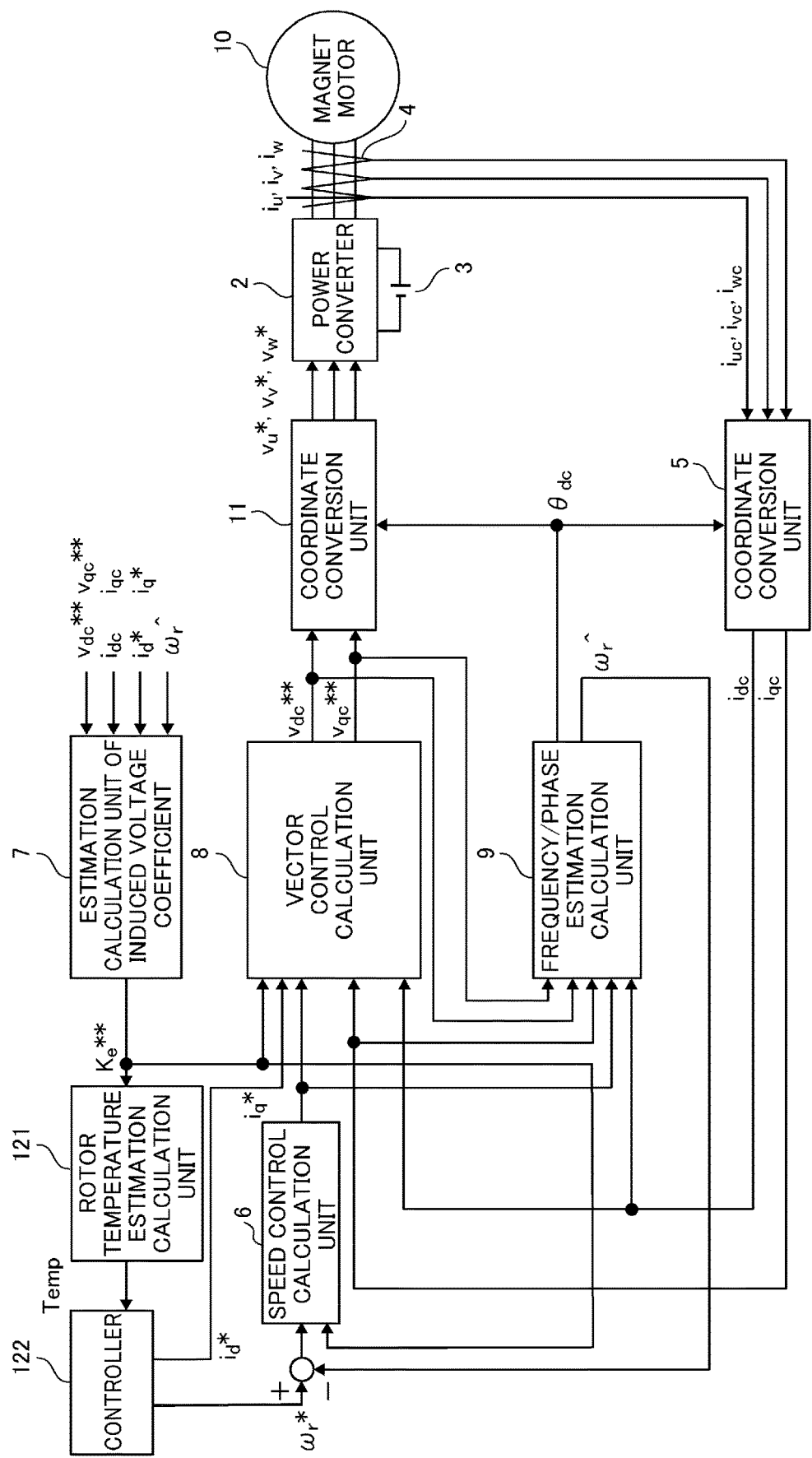
FIG. 12 is a diagram illustrating a configuration example of a power conversion device according to Example 8.

FIG. 12 is a configuration diagram of a power conversion device according to Example 8.

Examples 1 to 7 are an example of estimating the induced voltage coefficient by calculating the power. In contrast, Example 8 is an example of estimating the temperature of the magnet motor 10.

A rotor temperature estimation calculation unit 121, and a host controller 122 such as a programmable logic controller (PLC) or an IOT controller, which manages the state of the magnet motor, are added to the power conversion device 1 illustrated in FIG. 12. The other configurations are the same as those in FIG. 1.

The rotor temperature estimation calculation unit 121 calculates a rotor temperature estimation value Temp (° C.) of the magnet motor 10 by Expression (27) using the estimation value $K_e^{**}$ of the induced voltage coefficient. Here, it is assumed that the induced voltage coefficient decreases by 10% with a temperature change of 100° C., and the induced voltage coefficient at a temperature of 20° C. is set to $K_{e0}$.

[Expression 22]

$$\text{Temp}° \text{ c.} = 20° \text{ c.} + (1 - K_e^{**}/K_{e0}) \cdot \frac{100° \text{ c.}}{0.12} \qquad (27)$$

Further, the temperature estimation value Temp is fed back to the controller 122, and the controller 122 determines an optimum pattern of a torque current command id* and an excitation current command by using Expression (28).

[Expression 23]

$$i_d^* = -\frac{K_e^{**}}{2(L_d^* - L_q^*)} - \sqrt{\frac{K_e^{**2}}{4(L_d^* - L_q^*)^2} + i_q^{*2}} \qquad (28)$$

According to Example 8, as with Example 1, highly accurate control characteristics can be achieved.

Example 9

A magnet motor driving system according to Example 9 will be described with reference to FIG. 13. Example 9 is an example in which the power conversion devices according to Examples 1 to 8 are applied to the magnet motor driving system.

Such a magnet motor driving system includes the power conversion device 1, and the induction motor 1 driven thereby. Further, in an example, a terminal 31 such as a personal computer (PC) 311, a tablet 312, and a smart phone 313 is connected to the power conversion device 1. In addition, in an internal memory of a microcomputer including the power converter 2 or the other constituents to be mounted on the power conversion device 1, a control response frequency or a control gain (a proportional gain 26 and an integration gain 27) set in the proportional control or the integration control is set. The terminal 31 controls the power conversion device 1, and thus, may be referred to as a host device.

In an example, the proportional gain 26 and the integration gain 27 of the power conversion device 1 can be set and changed in accordance with an instruction from the terminal 31. In addition, in another example, the proportional gain 26 and the integration gain 27 of the power conversion device 1 can be set and changed in accordance with an instruction of a digital operator 112 of the power conversion device 1.

Note that, the proportional gain 26 and the integration gain 27 described above can also be set on a fieldbus such as a PLC, a local area network connected to a computer, and an IOT controller.

Note that, FIG. 13 illustrates the power conversion device 1 according to Example 1 (FIG. 1), but may illustrate the power conversion devices 1 according to Examples 2 to 6.

According to the induction motor driving system of Example 9, highly accurate control characteristics can be achieved in position sensorless vector control.

Example 10

Other Modification Examples

Examples 1 to 8 described above can be further modified in various manners. Hereinafter, some modification examples will be described.

For example, in Examples 1 and 2, the current detection values $i_{dc}$ and $i_{qc}$ are used in Expression (9) that is the first active power Pc and Expression (18) that is the first reactive power Qc, but the current command values $i_d^*$ and $i_q^*$ may be used. In addition, the current command values $i_d^*$ and $i_q^*$ are used in Expression (10) that is the second active power Pc^ and Expression (19) that is the second reactive power Qc^, but the current detection values $i_{dc}$ and $i_{qc}$ may be used.

In addition, in Examples 1 to 7, the voltage correction values $\Delta v_{dc}$ and $\Delta v_{qc}$ are prepared from the current command values $i_d^*$ and $i_q^*$ and the current detection values $i_{dc}$ and $i_{qc}$, and are subjected to the calculation represented by Expression (3) of adding the voltage correction value and a voltage reference value of vector control, but intermediate current command values $i_d^{}$ and $i_q^{}$ represented in Expression (22), which are used in vector control calculation, may be prepared from the current command values $i_d^*$ and $i_q^*$ and the current detection values $i_{dc}$ and $i_{qc}$, and vector control calculation represented in Expression (23) may be performed by using the frequency estimation value $\omega_r^{\wedge}$ and the electric circuit coefficient of the magnet motor 10.

[Expression 24]

$$\begin{bmatrix} i_d^{**} = \left(K_{pd1} + \frac{K_{id1}}{s}\right)(i_d^* - i_{dc}) \\ i_q^{**} = \left(K_{pq1} + \frac{K_{iq1}}{s}\right)(i_q^* - i_{qc}) \end{bmatrix} \quad (22)$$

[Expression 25]

$$\begin{bmatrix} v_{dc}^{*} = Ri_d^{} - \omega_r^{\wedge} L_q^* \frac{1}{1+T_q s} i_q^{} \\ v_{qc}^{*} = Ri_q^{**} + \omega_r^{\wedge} L_d^* \frac{1}{1+T_d s} i_d^{} + \omega_r^{\wedge} K_e^{} \end{bmatrix} \quad (23)$$

Here,
$K_{pd1}$: Proportional Gain of Current Control of d Axis,
  $K_{id1}$: Integration Gain of Current Control of d Axis
$K_{pq1}$: Proportional Gain of Current Control of q Axis,
  $K_{iq1}$: Integration Gain of Current Control of q Axis
$T_d$: Electric Time Coefficient ($L_d/R$) of d Axis, $T_q$: Electric Time Coefficient ($L_q/R$) of q Axis In addition, as another example, a voltage correction value $\Delta v_{d\_p}^*$ of a proportional calculation component of the d axis and a voltage correction value $\Delta v_{d\_i}^*$ of an integration calculation component of the d axis, a voltage correction value $\Delta v_{q\_p}^*$ of a proportional calculation component of the q axis, and a voltage correction value $\Delta v_{q\_i}^*$ of an integration calculation component of the q axis, which are used in the vector control calculation, may be prepared by Expression (24) from the current command values $i_d^{**}$ and $i_q^*$ and the current detection values $i_{dc}$ and $i_{qc}$, and the vector control calculation may be performed by Expression (25) using the frequency estimation value $\omega_r^{\wedge}$ and the electric circuit coefficient of the magnet motor 10.

[Expression 26]

$$\begin{bmatrix} \Delta v_{d\_p}^* = K_{pd2}(i_d^* - i_{dc}) \\ \Delta v_{d\_i}^* = \frac{K_{id2}}{s}(i_d^* - i_{dc}) \\ \Delta v_{q\_p}^* = K_{pq2}(i_q^* - i_{qc}) \\ \Delta v_{q\_i}^* = \frac{K_{iq2}}{s}(i_q^* - i_{qc}) \end{bmatrix} \quad (24)$$

[Expression 27]

$$\begin{bmatrix} v_{dc}^{****} = (\Delta v_{d\_p}^* + \Delta v_{d\_i}^*) - \omega_r^{\wedge} \frac{L_q^*}{R} \Delta v_{q\_i}^* \\ v_{qc}^{****} = (\Delta v_{q\_p}^* + \Delta v_{q\_i}^*) + \omega_r^{\wedge} \frac{L_d^*}{R} \Delta v_{d\_i}^* + \omega_r^{\wedge} K_e^* \end{bmatrix} \quad (25)$$

Here,
$K_{pd2}$: Proportional Gain of Current Control of d Axis,
  $K_{id2}$: Integration Gain of Current Control of d Axis
$K_{pq2}$: Proportional Gain of Current Control of q Axis,
  $K_{iq2}$: Integration Gain of Current Control of q Axis In addition, the vector control calculation may be performed by Expression (26) using a primary delay signal $i_{qctd}$ of the current command value $i_d^*$ of the d axis and the current detection value $i_{qc}$ of the q axis, the frequency estimation value $\omega_r^{\wedge}$, and the electric circuit coefficient of the induction motor 1.

[Expression 28]

$$\begin{bmatrix} v_{dc}^{*****} = Ri_d^* - \omega_r^{\wedge} L_q^* i_{qctd} \\ v_{qc}^{*****} = Ri_{qctd} + \omega_r^{\wedge} L_d^* i_d^* + \omega_r^{\wedge} K_e^{**} \end{bmatrix} \quad (26)$$

As another example, in the examples described above, in the frequency/phase estimation calculation unit 9, the frequency estimation value is calculated by Expression (7), but the encoder may be attached to the magnet motor 10, and the frequency detection value may be calculated from an encoder signal.

In addition, in the preferred example (refer to FIG. 1), in the power conversion device 1, the magnet motor 10, the power converter 2, the direct-current power source 3, and the current detector 4 are configured by hardware, and the other constituents 5 to 10 are achieved by executing the program in the processing device (CPU), but according to another example, a part or all of the other constituents 5 to 10 may be configured by hardware.

Note that, in all the examples described above, a switching element configuring the power converter 2 may be a silicon (Si) semiconductor element, or may be a wideband gap semiconductor element such as silicon carbide (SiC) or gallium nitride (GaN).

As described above, according to some examples, by using the active power or the reactive power, it is possible to achieve the power conversion device having highly accurate control characteristics without adjusting the electric circuit coefficient of the magnet motor that is set in the controller.

REFERENCE SIGNS LIST

1 Power conversion device
10 Magnet motor
2 Power converter
3 Direct-current power source
4 Current detector
5 Coordinate conversion unit
6 Speed control calculation unit
7 Estimation calculation unit of estimated induced voltage coefficient
8 Vector control calculation unit
9 Frequency/phase estimation calculation unit
11 Coordinate conversion unit
121 Rotor temperature estimation calculation unit
122 Controller
112 Digital operator of power conversion device
21 Voltage detector
22 Current detector
23 Encoder
24 Calculation unit of vector current component
25 Observation unit of current waveform of each unit
26 Proportional gain
27 Integration gain
31 Terminal
$i_d^*$ Current command value of d axis
$i_q^*$ Current command value of q axis
$\hat{\omega}_r$ Frequency estimation value
$\omega_r$ Frequency of magnet motor 10
$v_{dc}^*, v_{dc}^{}, v_{dc}^{*}, v_{dc}^{**}, v_{dc}^{***}$ Voltage command value
$v_{qc}^*, v_{qc}^{}, v_{qc}^{*}, v_{qc}^{**}, v_{qc}^{***}$ Voltage command value
$\hat{P}_c$ First active power
$P_c$ Second active power
$Q_c$ First reactive power
$\overline{Q_c}$ Second reactive power
$K_e^*$ Setting value of induced voltage coefficient
$\Delta K_e^*$ Correction value of induced voltage coefficient
$K_e^{**}$ Estimation value of induced voltage coefficient

The invention claimed is:

1. A power conversion device controlling a magnet motor, comprising:
a controller configured to:
calculate a first power based on an output voltage and an output current of the magnet motor,
calculate a second power based on an electric circuit coefficient, a current command, an output frequency, and an induced voltage coefficient of the magnet motor,
estimate the induced voltage coefficient so that the first power follows the second power,
control driving of the magnet motor in accordance with the induced voltage coefficient, wherein
the controller calculates the induced voltage coefficient so that a deviation between the first active power and the second active power is set to zero or so that a deviation between the first reactive power and the second reactive power is set to zero, on the basis of a relationship between the electric circuit coefficient and a frequency estimation value of the magnet motor,
perform proportional control and integration control so that the deviation between the first active power and the second active power is set to zero when the magnet motor is in a low speed region, and
perform the proportional control and the integration control so that a deviation between the first reactive power and the second reactive power is set to zero when the magnet motor is in a medium-high speed region.

2. The power conversion device according to claim 1, wherein the first power is a first active power calculated based on the output voltage and the output current of the magnet motor, and
the second power is a second active power calculated based on the electric circuit coefficient, the current command, the output frequency, and the induced voltage coefficient of the magnet motor.

3. The power conversion device according to claim 1, wherein the first power is a first reactive power calculated based on the output voltage and the output current of the magnet motor, and
the second power is a second reactive power calculated based on the electric circuit coefficient, the current command, the output frequency, and the induced voltage coefficient of the magnet motor.

4. The power conversion device according to claim 2, wherein the controller is also configured to:
output a voltage command value of a d axis that is a magnetic flux axis and a q axis that is a torque axis by using a current command value and a current detection value of the d axis and the q axis, and the output frequency of the magnet motor, wherein
the controller obtains the first active power by multiplying the voltage command value and the current detection value of the d axis and the voltage command value and the current detection value of the q axis of the same component, and by adding the multiplied values to each other,
the controller obtains the second active power by being calculated from the electric circuit coefficient, the current command values of the d axis and the q axis, the output frequency, and the induced voltage coefficient of the magnet motor, and
the controller controls the induced voltage coefficient so that the first active power follows the second active power.

5. The power conversion device according to claim 2, wherein the controller is also configured to:
output a voltage command value of a d axis that is a magnetic flux axis and a q axis that is a torque axis by using a current command value and a current detection value of the d axis and the q axis, and the output frequency of the magnet motor, wherein
the controller obtains the first active power by multiplying a direct-current voltage detection value and a direct-current current detection value of a power converter,
the controller obtains the second active power by being calculated from the electric circuit coefficient, the current command value of the d axis and the q axis, the output frequency, and the induced voltage coefficient of the magnet motor, and the induced voltage coefficient is controlled so that the first active power follows the second active power.

6. The power conversion device according to claim 2, wherein the controller is also configured to:
output a voltage command value of a three-phase alternating current by using a current command value and a current detection value of the three-phase alternating current, and the output frequency of the magnet motor, wherein the controller obtains the first active power by multiplying the voltage amplitude value and the current amplitude value of the three-phase alternating current for one phase and a cosine signal of a phase difference between the voltage command value and the current detection value, the controller obtains the second active power by being calculated from the electric circuit coefficient, the current command value of a d axis and a q axis, the output frequency, and the induced voltage coefficient of the magnet motor, and the controller controls the induced voltage coefficient so that the first active power follows the second active power.

7. The power conversion device according to claim 3, wherein the controller is also configured to:

output a voltage command value of a d axis that is a magnetic flux axis and a q axis that is a torque axis by using a current command value and a current detection value of the d axis and the q axis, and the output frequency of the magnet motor, wherein the controller obtains the first reactive power by multiplying the voltage command value and the current detection value of the d axis and the voltage command value and the current detection value of the q axis of different components, and by subtracting the multiplied values from each other, the controller obtains the second reactive power by being calculated from the electric circuit coefficient, the current command value of the d axis and the q axis, the output frequency, and the induced voltage coefficient of the magnet motor, and the controller controls the induced voltage coefficient so that the first reactive power follows the second reactive power.

8. The power conversion device according to claim 3, wherein the controller is also configured to:

output a voltage command value of a three-phase alternating current by using a current command value and a current detection value of the three-phase alternating current, and the output frequency of the magnet motor, wherein the first reactive power is obtained by multiplying the voltage amplitude value and the current amplitude value of the three-phase alternating current for one phase and a sine signal of a phase difference between the voltage command value and the current detection value, the controller obtains the second reactive power by being calculated from the electric circuit coefficient, the current command value of a d axis and a q axis, the output frequency, and the induced voltage coefficient of the magnet motor, and the controller controls the induced voltage coefficient so that the first reactive power follows the second reactive power.

9. The power conversion device according to claim 1, wherein the controller automatically corrects a control gain of the proportional control and the integration control based on at least of any one of the output frequency or the current command value of the q axis of the magnet motor.

10. The power conversion device according to claim 1, wherein the controller is also configured to set or change a control response frequency or the control gain set in the proportional control or the integration control in accordance with an instruction from a digital operator of a terminal connected to the power conversion device or the power conversion device.

11. The power conversion device according to claim 1, wherein the controller is also configured to:

estimate a rotor temperature in the magnet motor by using the induced voltage coefficient.

12. The power conversion device according to claim 11, wherein the induced voltage coefficient is fed back to the controller, and the controller is configured to determine an optimum pattern of a torque current command and an excitation current command.

13. The power conversion device according to claim 11, wherein an estimation value of the induced voltage coefficient or the rotor temperature is fed back to the controller, and the controller is configured to manage a state of the magnet motor.

* * * * *